United States Patent
Palumbo et al.

(10) Patent No.: US 9,124,617 B2
(45) Date of Patent: Sep. 1, 2015

(54) SOCIAL NETWORK PROTECTION SYSTEM

(71) Applicant: F-Secure Corporation, Helsinki (FI)

(72) Inventors: Paolo Palumbo, Helsinki (FI); Andrew Patel, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 13/933,193

(22) Filed: Jul. 2, 2013

(65) Prior Publication Data

US 2014/0013435 A1  Jan. 9, 2014

(30) Foreign Application Priority Data

Jul. 4, 2012  (GB) .................................. 1211875.8

(51) Int. Cl.
| | |
|---|---|
| H04L 29/06 | (2006.01) |
| G06F 21/56 | (2013.01) |
| G06Q 50/00 | (2012.01) |
| G06Q 10/10 | (2012.01) |
| H04W 4/20 | (2009.01) |

(52) U.S. Cl.
CPC .............. *H04L 63/14* (2013.01); *G06F 21/56* (2013.01); *G06F 21/564* (2013.01); *G06F 21/566* (2013.01); *G06Q 10/10* (2013.01); *G06Q 50/01* (2013.01); *H04L 63/1483* (2013.01); *H04W 4/206* (2013.01); *H04L 63/108* (2013.01); *H04L 63/145* (2013.01)

(58) Field of Classification Search
CPC ........................... H04L 63/20; H04L 63/1483
USPC .......................................................... 726/24
See application file for complete search history.

(56) References Cited

U.S. PATENT DOCUMENTS

| | | | |
|---|---|---|---|
| 2003/0018903 A1* | 1/2003 | Greca et al. ................... | 713/188 |
| 2005/0138109 A1* | 6/2005 | Redlich et al. ............... | 709/201 |
| 2009/0119681 A1* | 5/2009 | Bhogal et al. ................ | 719/318 |
| 2011/0213974 A1* | 9/2011 | Ardon et al. .................. | 713/169 |
| 2013/0138569 A1* | 5/2013 | Yan et al. ....................... | 705/50 |

FOREIGN PATENT DOCUMENTS

| | | |
|---|---|---|
| EP | 1 990 973 A2 | 11/2008 |
| EP | 1 990 973 A3 | 9/2012 |

OTHER PUBLICATIONS

Guanhua Yan et al: "Malware Propagation in Online Social Networks", Department of Computer Science; University of Massachusetts Lowell, (Mar. 22, 2011), (pp. 196-206).

Kostas G. Anagnostakis et al: "Coverage Detecting and Reacting to Worm Epidemics Using Cooperation and Validation", International Journal of Information Security, vol. 6, No. 6, (Jul. 10, 2007), (pp. 361-378).

* cited by examiner

*Primary Examiner* — Jason K Gee
(74) *Attorney, Agent, or Firm* — Harrington & Smith

(57) ABSTRACT

A method of inhibiting the spread of malware across a network of interconnected computer terminals. The method includes detecting malware or suspicious behavior at a first computer terminal and inspecting the first computer terminal, before and/or after said step of detecting malware or suspicious behavior, to identify contacts forming part of a social network. Identities of the identified contacts are sent to a backend security system, and at the backend security system, said identities are received and instructions sent to one or more second computer terminals associated with respective identities to cause those second computer terminals to implement an increased level of security.

14 Claims, 5 Drawing Sheets

SOCIAL NETWORK PROTECTION SYSTEM

TECHNICAL FIELD

The present invention relates to a social network protection system, and more particularly to a system for protecting the computer terminals used by members of or participants in a social network.

BACKGROUND

The vulnerability of computer terminals and computer systems, including desktop PCs, laptops, tablet computers, mobile phones etc, to attack by malware and other intrusion processes (often referred to as computer "infections") is widely acknowledged. Cautious users and system operators will protect their computers and systems by deploying appropriate security applications including antivirus applications. Security applications will introduce firewalls to defend against intrusion, as well as various engines to detect and eliminate malware including viruses, trojans, worms, spyware etc.

In recent years, social networking sites such as Facebook™ have seen a huge rise in popularity. Social networks allow people to share information and communicate with friends and family in a convenient manner. However, attackers have also seen the benefits of social networking sites, and have made these the subject of attacks. One such attack involves the attacker obtaining the credentials of one of the members of the network, and using the hacked account to post links or send messages, directing other members to malicious sites. The attack relies upon "friends" of the hacked user trusting that user's postings. "Koobface" is a computer worm which first appeared in 2008 and which uses this approach. In particular, it causes the hacked computer to send Facebook messages to friends, the message directing the recipient to a third-party website which prompts the friend to install a fake software update. If the friend chooses to install the update, his or her computer is joined to a botnet used for harvesting further user credentials and for serving pay-per-install software. The infected computer then spreads the botnet further in the same way.

Attacks of the type described in the previous paragraph are defended against to some extent by conventional security approaches. For example, security software may be able to detect an attempt to install a worm on a local system, or may detect redirection of a web browser to a malicious website. Nonetheless, it is always desirable to increase levels of security, for example to defend against attacks by previously unknown malware and intrusion techniques (so-called "zero day attacks") as well as to protect computers and systems that may not have appropriate (e.g. up to date) security systems installed.

EP1990973 describes the provision of malware detection systems within a social network of computers based upon an analysis of communication patterns between the different users and the propagation of malwares through the network.

SUMMARY

Attacks relying upon social networks to spread can be defended against by taking advantage of those very networks. In particular, networks of connections present or identified within a social network can be used to quarantine a user or group of users in order to inhibit further spreading of an attack.

According to a first aspect of the present invention there is provided a method of inhibiting the spread of malware across a network of interconnected computer terminals. The method comprises detecting malware or suspicious behaviour at a first computer terminal and inspecting the first computer terminal, before and/or after said step of detecting malware or suspicious behaviour, to identify contacts forming part of a social network. Identities of the identified contacts are sent to a backend security system, and at the backend security system, said identities are received and instructions sent to one or more second computer terminals associated with respective identities to cause those second computer terminals to implement an increased level of security. The method further comprises subsequently determining that the threat level presented to one or more of said second computers has reduced and as a result sending instructions to the one or more second computer terminals to cause those second computer terminals to implement a reduced level of security.

The first and second computer terminals may each be provided with a security client and one or more social networking applications, and, at said first computer terminal, said security client performs the step of detecting malware or suspicious behaviour, and performs said step of inspecting that computer terminal by interacting with the or each social networking application provided at the first computer terminal. At a second computer terminal, the security client may receive an instruction from the backend security system to implement an increased level of security, and acts to increase the security level.

The step of sending identities of the identified contacts to a backend security system may comprise sending anonymized social networking identities of said contacts. These anonymized identities may be obtained by hashing the identities.

Upon receipt of the identities, the backend security system may identify those identities that have an associated security subscription and in turn determine second computer terminals associated with the security subscriptions, and then send said instructions to those second computer terminals.

The method may comprise, following said step of sending identities of the identified contacts to a backend security system, periodically reporting from said first computer to the backend security system for so long as the malware or suspicious behaviour continues to be detected at said first computer terminal. At said backend security system, it is determined when said malware or suspicious behaviour has been present at and reported by said first computer terminal for a period longer than some threshold period and, in response, an instruction sent to the first computer terminal to stop that terminal connecting to the social network. At the backend security system, when it is determined that said malware or suspicious behaviour has not been reported by said first computer terminal for a period longer than some threshold period, in response, an instruction is sent to the second computer terminals to implement a reduced level of security.

DETAILED DESCRIPTION

In order to inhibit the spread of computer infections via social networks such as Facebook™, the spread of such infections across computer networks has been modelled. Using the results, it has been discovered that spreading of the infection can be inhibited by creating a "protective bubble" around one or more affected users where the extent of the bubble is determined to a large extent by the social network connections of the affected user(s). Even if the bubble is not complete, i.e. there are holes in it, the protection afforded can be sufficient to prevent widespread infection from occurring. The approach relies upon the exchange of connection data between one or more social networking applications and a computer security system. When it is determined that a user or users is or are infected with malware, or have an increased risk of infection, e.g. due to their exhibiting certain undesirable behaviours, the security system acts to increase the level of security implemented at the terminals of social network contacts (direct and possibly indirect) of the affected user(s)

Figure 1:
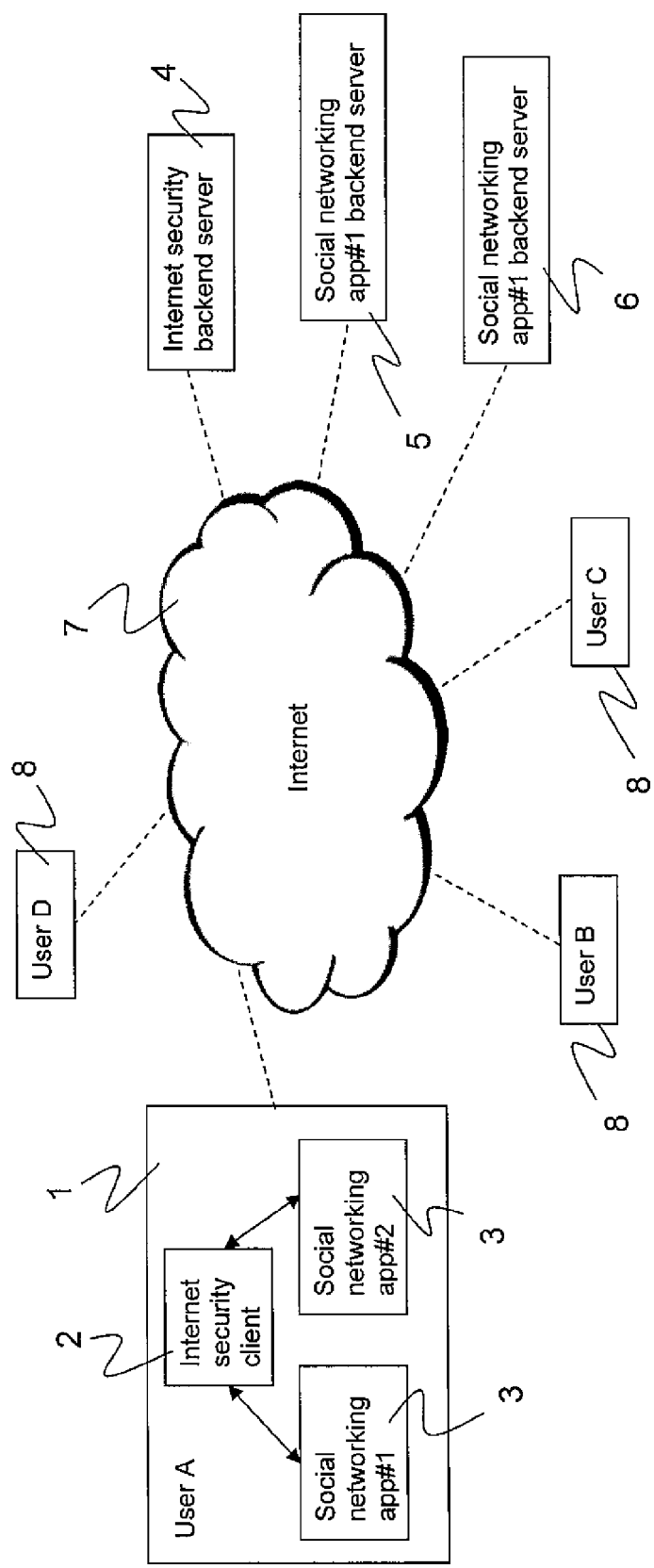
FIG. 1 illustrates schematically a computer network including various backend systems and a multiplicity of client terminals.

Implementation of this approach makes use of 1) a client-side component that is installed as part of a security product, e.g. F-Secure™ Internet Security, 2) an application that is installed in the user's social networking framework (e.g. a Facebook application), and 3) a backend system hosted on one or more servers (referred to below as "the cloud"). This architecture is illustrated schematically in FIG. 1, where a first user computer terminal (User A) is identified with reference numeral 1. The terminal is provided, by means of appropriate software, with an Internet Security client 2 and two social networking applications (apps) 3. These apps could be for example a Facebook™ app and a Twitter™ app. Of course, more or fewer apps may be installed on the terminal 1. FIG. 1 also illustrates a backend server 4 that is operated by the provider of the Internet security service. It will be appreciated that this server 4 will most likely form part of a service cloud or server cluster, but only a single server is illustrated by way of example. The Internet security client and backend server communicate securely via the Internet 7. In a similar manner, the social networking app#1 and app#2 communicate, via the Internet, with respective backend servers 5 and 6. FIG. 1 also illustrates a number of additional user terminals 8 (User B, C and D) which similarly are provided with Internet security clients and social networking apps.

When the Internet security client 2 is first installed in a user terminal (or "node"), as part of the registration process the user will be allocated a unique subscription identity. This identity is used whenever the Internet security client communicates with the backend server 4, e.g. to obtain updates. Assuming that all users (A to D) are using the same security provider, the backend server will possess unique subscription identities for each of the users. At installation on a user terminal, the Internet security client 2 will inspect each already installed social networking app 3 to determine a) the social networking identity of the user, e.g. "www.facebook.com/myname" and b) the social network identities of the user's contacts. The Internet security client 2 then anonymizes these identities, e.g. by separately hashing the identities, and sends the hashed identities to the Internet security backend server 4.

This backend server 4 maintains a mapping between:
a) the subscription identity of the reporting user,
b) that user's (anonymized) social network identity (identities), and
c) the anonymized social network identities of the user's contacts.

This process is repeated for each user having a subscription with the security service. Periodically, the Internet security client 2 on a user terminal will check with the installed social networking apps to obtain updated contact information and will report this to the backend server 4. If further social networking apps are subsequently installed on the computer terminal, the Internet security client 2 will detect this and repeat the process for the new apps.

Considering further the Internet security client 2, this may make use of the following processes (detection "engines") to determine whether the client has been infected by malware or is vulnerable to infection:

Standard anti-virus detection methods. The security software detects known malware on the system using either local virus definitions or using a network query.

Heuristic anti-virus detection methods. The security software detects unknown malware on the system via a combination of heuristic rules and an association method for these rules.

Heuristic behavioral-based detection methods. If a piece of software on the system attempts to perform an operation that is potentially undesirable, such as opening a network port, attempting to write to a certain location in the file system or attempting to hook some other running process, or a combination of such events, heuristic detection will rate the behavior and potentially trigger a detection event, such as blocking the software in question.

Browser-based blocking. The URL of each site the user visits is queried against a database of known URLs that classifies them as trusted or un-trusted. If the user visits a URL that is un-trusted, access is blocked and a detection event is triggered.

Social network heuristics. The detection method tracks the user's behavior in the framework of a social network and will trigger a detection event if the behavior is somehow out of the ordinary or potentially unsafe.

Figure 2:
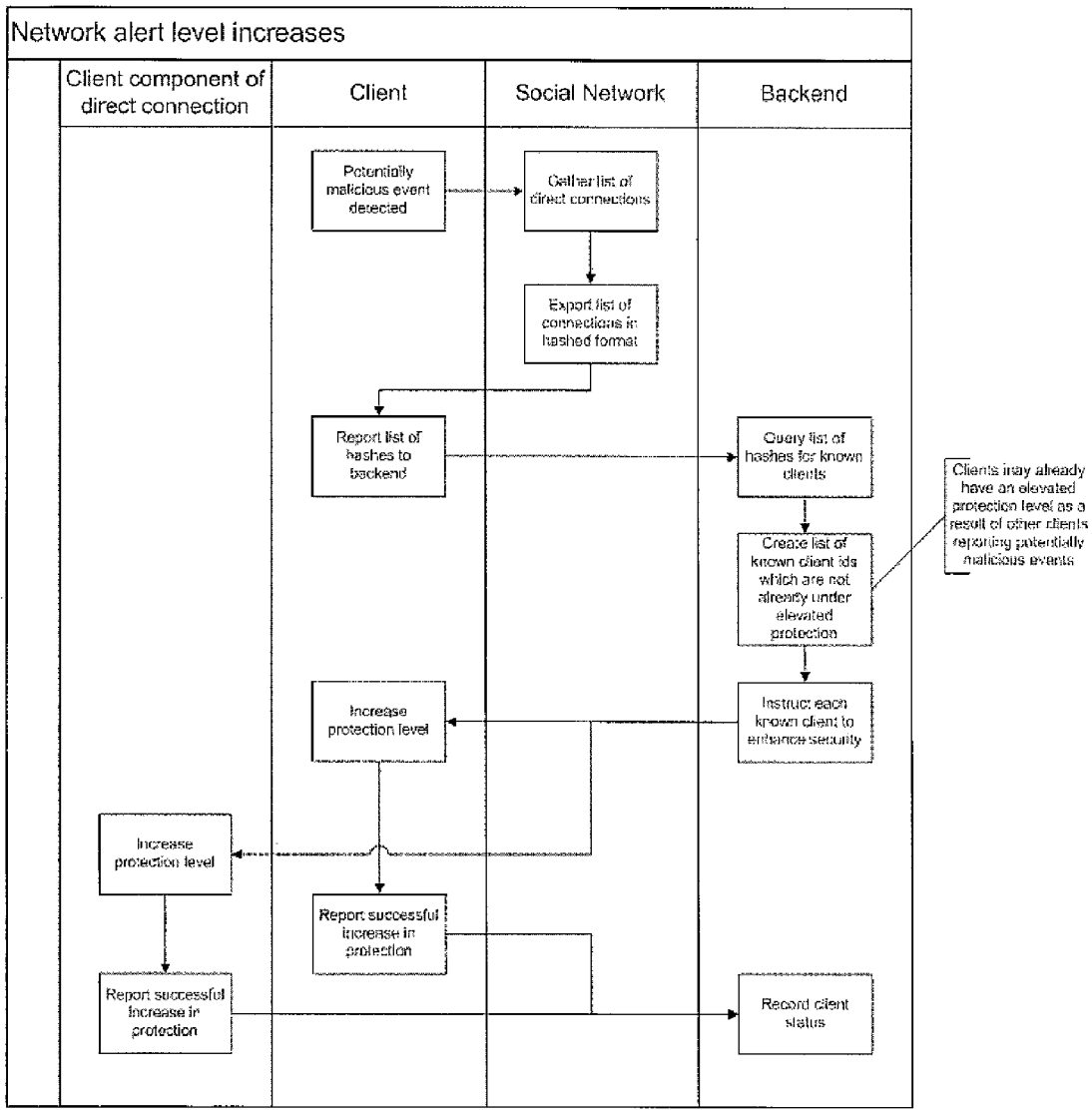
FIG. 2 illustrates schematically a process for creating a protective "bubble" around a suspicious client terminal.

If a potential infection is detected on a computer terminal by the Internet security client, the process illustrated by the flow diagram of FIG. 2 is used to contain the spread of the malware. In the Figure, from left to right: the "Client component of direct connection" represents the Internet security client of "friends" of a user that possesses a computer that is infected with malware or that otherwise exhibits suspicious behaviour; the "Client" represents the Internet security client of that affected computer; the "Social Network" represents a social network app or apps installed on the affected computer; and the "Backend" represents the Internet security backend system (composed of multiple backend servers). [In FIG. 2, the process involves the client gathering a list of direct connections from the social network app in the event that a malicious event is detected. This may be in addition to, or an alternative to, gathering that information upon installation of the Internet security client or app, and/or periodically.]

When the client reports the list of hashes (of direct contacts) to the backend system, the backend system searches it's subscription database to determine whether or not subscriptions exist for any of the reported hashes. If subscriptions are identified, the backend system sends instructions to the respective computers in order to cause those computers to move to a heightened protection level. It is noted that the backend system is "isolated" from other subscription data held by the security service provider, and in particular from identity details of those contacts of the affected user. As such, subscribers and other users do not have their contacts exposed to the service provider, other than in anonymized form.

The infected (or potentially infected system) and all known directly-connected nodes are activated by the backend system to engage a more "paranoid" detection mode. The added security measures that are activated on the target computers may include the following:

Deep scan mode. The parameters used by heuristic algorithms on each client would be adjusted to trigger at a lower threshold than in the "normal" operating mode.

Detection of automated systems for accessing web sites. A more thorough scan of running processes and the actions that they are performing is carried out in order to detect behavior such as scripted access to web pages Network-layer analysis. Interception of incoming and outgoing network traffic and analysis of the type of traffic, ports used, as well as source and destination is carried out. The results are, in turn, fed into heuristic algorithms and reputation lookup systems to identify potentially unwanted behavior.

Scanning of social network usage behavior. Network traffic or browser analysis is carried out to allow the interpretation of actions happening between the client computer and social network. These actions are then examined for unwanted behavior, for example, posting links to un-trusted URLs.

Full system scan. A full scan of all files on a system is carried out using the local Security software after the initial discovery of a potential infection.

Paranoid browsing protection. Under normal conditions, a browsing protection system would only block a user from visiting sites that are known to be un-trusted. In a more paranoid mode, sites for which there is no trust information would be either blocked or at least a warning would be presented to the user upon attempting to visit them. A further enhancement to this mode would be that, if a URL is not known, a backend system would load the page and determine if any threat exists, before returning a verdict. Such an action would block access to that URL until the page has been verified.

Block access to the social network. In more extreme cases, it might be necessary to block access to a social network itself from one or more nodes. This is effectively a full quarantine and should be used only if the threat level is sufficiently high and no alternative and appropriate measures are available. As the backend system will have a high-level view of the topology and activity in the social network, it should be possible, using server-side analysis and heuristics, to detect a fast, widespread attack, which may require such a full quarantine action.

Figure 3:
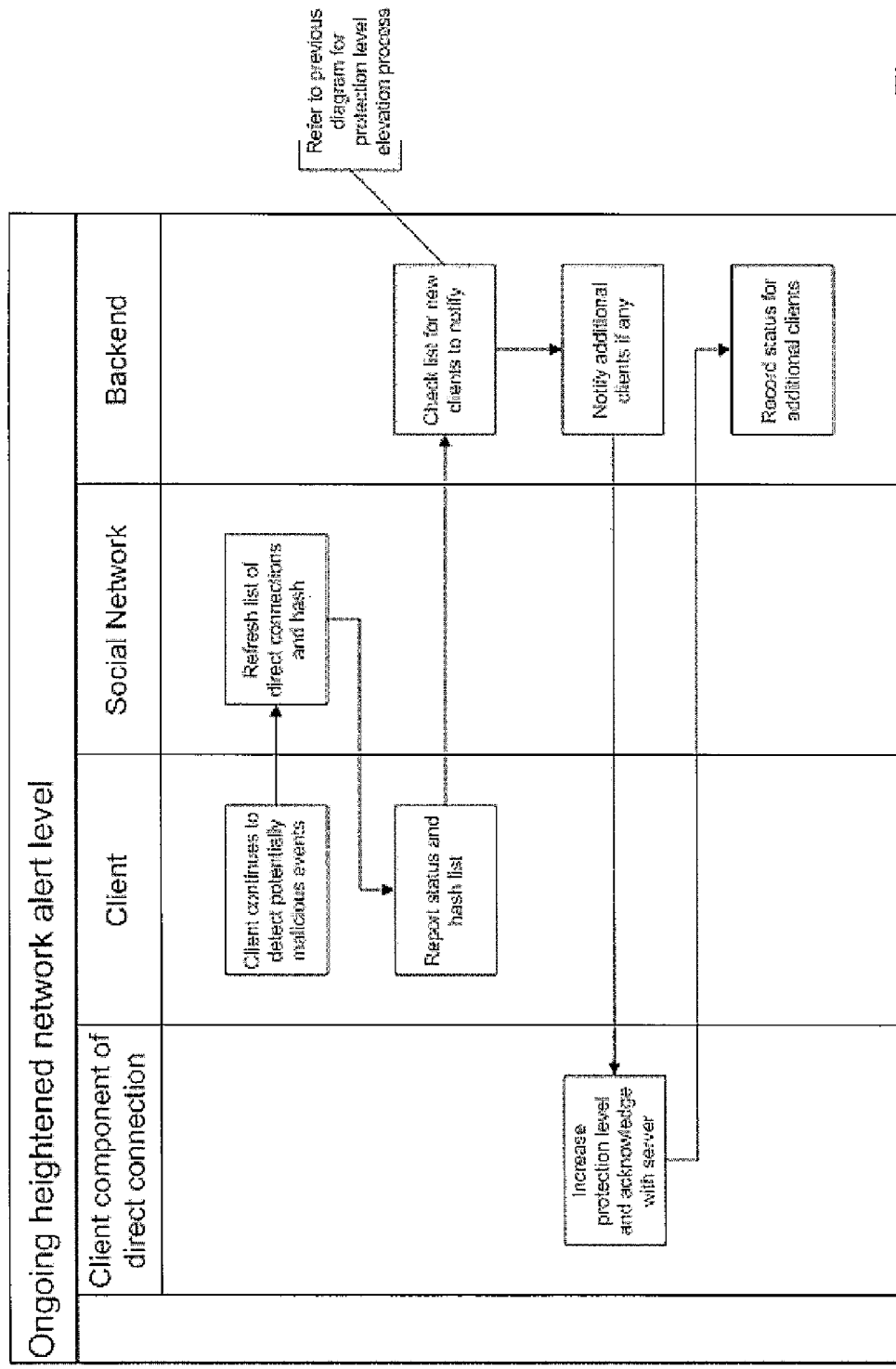
FIG. 3 illustrates schematically a process for maintaining and extending (or reducing) the extend of a protective bubble around a suspicious client terminal.
Figure 4:
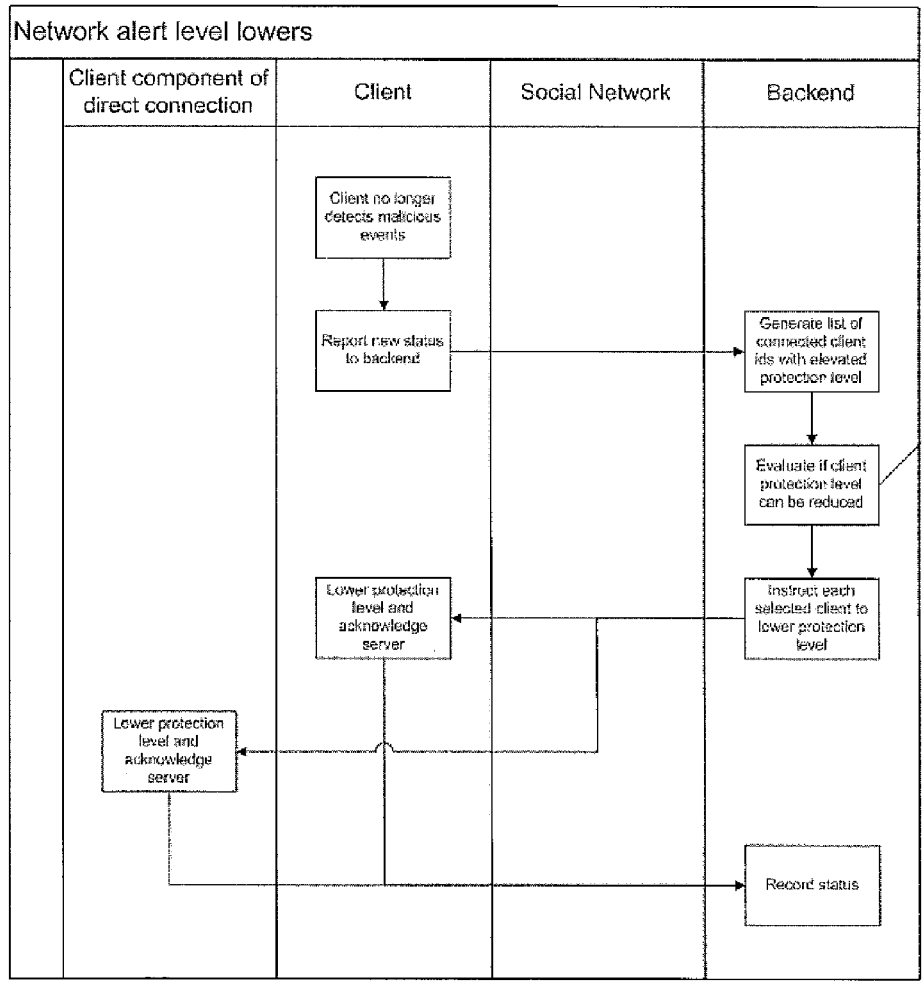
FIG. 4 illustrates schematically a process for terminating a protective bubble around a suspicious client terminal.

For so long as a node continues to report potentially malicious behaviour to the backend system, the protective bubble will remain active. If the affected node creates new social connections, the system will extend the protection to those nodes. This is illustrated in FIG. 3 where, when the client continues to detect potentially malicious events, it periodically obtains a refreshed list of direct connections from the social network app. The client then reports the current status and provides the refreshed list of (hashed) connections to the backend which in turn increases the level of security implemented at any "new" connections. Of course, when the affected node ceases to report malicious behaviour, the protective bubble is removed (at least assuming that this node is not within some other protective bubble). The associated process is illustrated in FIG. 4. When the client reports the updated status to the backend, the backend will first determine whether the level of client protection may be reduced. It may consider, for example, that some delay should be implemented before such action is taken. If and when the decision to lower the protection level is taken, the backend will instruct the clients forming the bubble to act accordingly. These clients may report their new status to the backend.

If a node that was previously reporting potentially malicious behaviour (and thus initiates the formation of a protective bubble) stops connecting to the backend system for an extended period of time, the backend system will lower the protection level on the clients ("friends") belonging to the protective bubble. This avoids leaving the friends in a heightened security state for a prolonged period of time, as to do so would likely impose restrictions on usage, force user decisions to be made, and possibly impact system performance. On the other hand, if a client reports potentially malicious behaviour for an extended period of time, the backend system may disallow that client access to the social network until the problem is fixed. The duration of the "wait" period after which the above scenarios will activate is backend-configurable. However, an example duration could be one week.

Figure 5:
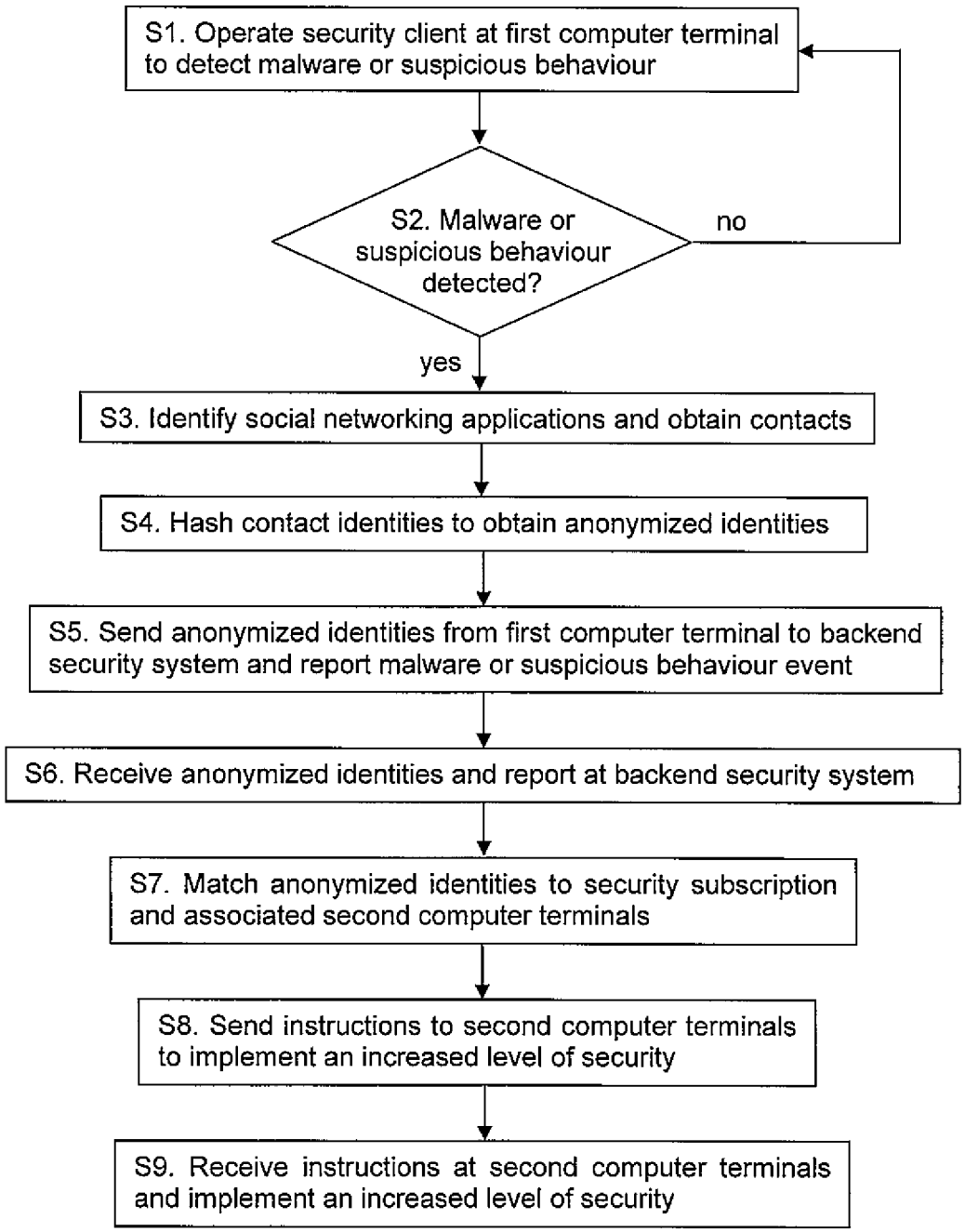
FIG. 5 is a flow diagram further illustrating the process for creating a protective "bubble" around a suspicious client terminal.

Referring now to FIG. 5, this shows a flow diagram to further illustrate the quarantining process. At step S1, the security client is operated on a first computer terminal. Using standard and possibly extended techniques, malware or suspicious behaviour is detected at step S2. At step S3, social networking applications in use on the first computer terminal are identified, and the social networking contacts are obtained (this step is shown as occurring after the malware detection step S2, but it could be carried out prior to that step). At step S4, the identities of the contacts are anonymized, e.g. using a hashing process. At step S5, the anonymized contacts are sent to a backend security system together with an appropriate alert (again steps S4 and S5 may be carried out prior to step S2). The backend security system receives the anonymized identities at step S6, and at step S7 matches these to security subscriptions and associated second computer terminals. At step S8 instructions are sent to the second computer terminals associated with respective identities, and at step S9 these instructions are received at those second computer terminals and an increased level of security is implemented.

The approach presented here may be used by the backend system to build a representation of the topology of social networks and to track and analyze behavioural trends within these networks. This can be done without collecting sensitive user data. Behaviour patterns and security alerts could then be used to pinpoint nodes that require additional protection or quarantine, and to potentially predict the occurrence of events. The ability to store behavioural trends for each node also opens up the possibility of implementing backend heuristic analysis which would allow the system to identify and flag usage anomalies, analogous to how banking systems safeguard credit card owners.

It will be appreciated by the person of skill in the art that various modifications may be made to the above embodiments without departing from the scope of the present invention.

The invention claimed is:

1. A method of inhibiting the spread of malware across a network of interconnected computer terminals, the method comprising:
    detecting malware or suspicious behaviour at a first computer terminal;
    inspecting the first computer terminal, before and/or after said step of detecting malware or suspicious behaviour, to identify contacts forming part of a social network;

anonymizing identities of said contacts and sending the anonymized identities to a backend security system and periodically reporting from said first computer terminal to the backend security system for so long as the malware or suspicious behaviour continues to be detected at said first computer terminal and at said backend security system, determining when said malware or suspicious behaviour has been present at and reported by said first computer terminal for a period longer than some threshold period and, in response, sending an instruction to the first computer terminal to stop that terminal connecting to the social network;

at the backend security system, receiving said anonymized identities and sending instructions to one or more second computer terminals associated with respective anonymized identities to cause those second computer terminals to implement an increased level of security; and subsequently determining that the threat level presented to one or more of said second computers has reduced and as a result sending instructions to the one or more second computer terminals to cause those second computer terminals to implement a reduced level of security.

2. A method according to claim 1, wherein the first and second computer terminals are each provided with a security client and one or more social networking applications, and, at said first computer terminal, said security client performs the step of detecting malware or suspicious behaviour, and performs said step of inspecting that computer terminal by interacting with the or each social networking application provided at the first computer terminal.

3. A method according to claim 2, wherein, at a second computer terminal, the security client receives an instruction from the backend security system to implement an increased level of security, and acts to increase the security level.

4. A method according to claim 3, wherein the increased level of security implements one or more of the following at the second client terminal:
   a deep scan mode;
   detection of automated systems for accessing web sites;
   scanning of social network usage behavior;
   a full system scan;
   paranoid browsing protection; and
   blocking access to the social network.

5. A method according to claim 2, wherein said step of detecting malware or suspicious behaviour comprises one or more of:
   signature based anti-virus detection methods;
   heuristic anti-virus detection methods;
   heuristic behavioral-based detection methods;
   browser-based blocking; and
   social network heuristics.

6. A method according to claim 1, wherein said anonymized identities are obtained by hashing the identities.

7. A method according to claim 1, wherein, upon receipt of the identities, the backend security system identifies those identities that have an associated security subscription and in turn determines second computer terminals associated with the security subscriptions, and then sends said instructions to those second computer terminals.

8. A method of inhibiting the spread of malware across a network of interconnected computer terminals, the method comprising:

detecting malware or suspicious behaviour at a first computer terminal;

inspecting the first computer terminal, before and/or after said step of detecting malware or suspicious behaviour, to identify contacts forming part of a social network;

anonymizing identities of said contacts and sending the anonymized identities to a backend security system and periodically reporting from said first computer terminal to the backend security system for so long as the malware or suspicious behaviour continues to be detected at said first computer terminal at said backend security system;

at the backend security system, receiving said anonymized identities and sending instructions to one or more second computer terminals associated with respective anonymized identities to cause those second computer terminals to implement an increased level of security; and determining when said malware or suspicious behaviour has not been reported by said first computer terminal for a period longer than some threshold period and, in response, sending an instruction to the second computer terminals to implement a reduced level of security.

9. A method according to claim 8, wherein the first and second computer terminals are each provided with a security client and one or more social networking applications, and, at said first computer terminal, said security client performs the step of detecting malware or suspicious behaviour, and performs said step of inspecting that computer terminal by interacting with the or each social networking application provided at the first computer terminal.

10. A method according to claim 9, wherein, at a second computer terminal, the security client receives an instruction from the backend security system to implement an increased level of security, and acts to increase the security level.

11. A method according to claim 10, wherein the increased level of security implements one or more of the following at the second client terminal:
   a deep scan mode;
   detection of automated systems for accessing web sites;
   scanning of social network usage behavior;
   a full system scan;
   paranoid browsing protection; and
   blocking access to the social network.

12. A method according to claim 9, wherein said step of detecting malware or suspicious behaviour comprises one or more of:
   signature based anti-virus detection methods;
   heuristic anti-virus detection methods;
   heuristic behavioral-based detection methods;
   browser-based blocking; and
   social network heuristics.

13. A method according to claim 8, wherein said anonymized identities are obtained by hashing the identities.

14. A method according to claim 8, wherein, upon receipt of the identities, the backend security system identifies those identities that have an associated security subscription and in turn determines second computer terminals associated with the security subscriptions, and then sends said instructions to those second computer terminals.

* * * * *